L. P. HARADON.
Window Sash.

No. 164,836.   Patented June 22, 1875.

Witnesses:
H. A. Daniels
A. P. Lacey

Inventor:
Lyman P. Haradon
By W. Burris

UNITED STATES PATENT OFFICE.

LYMAN P. HARADON, OF CLINTON, IOWA.

IMPROVEMENT IN WINDOW-SASHES.

Specification forming part of Letters Patent No. 164,836, dated June 22, 1875; application filed April 24, 1875.

*To all whom it may concern:*

Be it known that I, LYMAN P. HARADON, of Clinton, in the county of Clinton and State of Iowa, have invented certain new and useful Improvements in Window-Sash; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
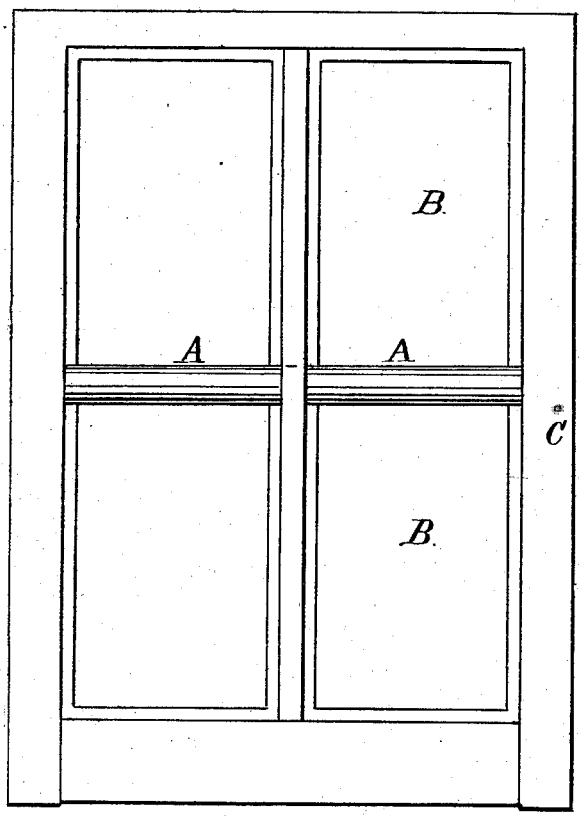
Figure 2:
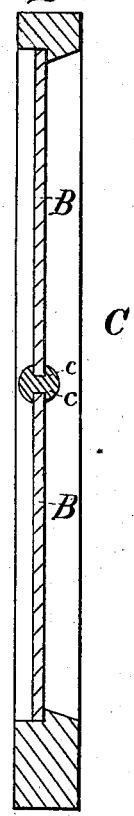
Figure 3:

Figure 1 is a side elevation of the sash. Fig. 2 is a longitudinal section. Fig. 3 is a transverse section.

My invention relates to an improved window-sash; and consists of a round division-bar, made with grooves of proper width to receive and hold the glass without putty or other support, as hereinafter fully described, and shown in the drawings.

A represents a round division-bar, made with grooves c on each side, to receive and securely hold the ends of the window-glass B without putty or other support. C represents the stiles of the sash, made with round holes to receive the ends of the round bars, which, being set in from the surface, as shown in Fig. 2, are not liable to interfere with the bars or rails of the other section of the sash in raising and lowering the sash.

The upright bars of window-sash may be made like bars A.

What I claim as new, and desire to secure by Letters Patent, is—

An improved window-sash, having a round muntin, or division-bar, A, inserted in a round hole, and set in from the surface of the sash, and provided with grooves C, to receive and hold the glass, substantially as and for the purposes described and shown.

In testimony that I claim the foregoing as my own invention, I hereunto affix my signature in presence of two witnesses.

LYMAN P. HARADON.

Witnesses:
W. W. SANBORN,
F. G. CLAUSIN.